Figure 1:
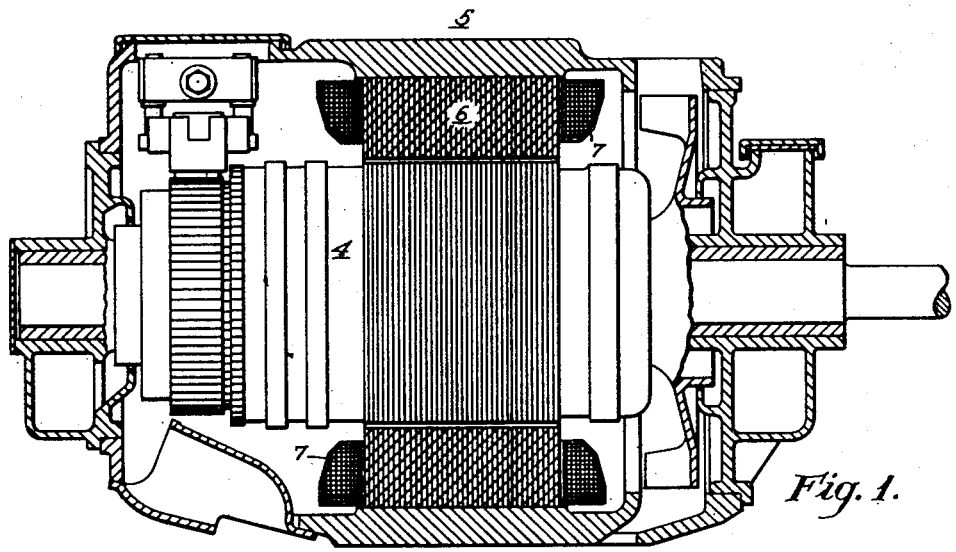

Aug. 24, 1948.   C. H. BRAITHWAITE, JR   2,447,631
WATERPROOF ELECTRICAL COIL
Filed Sept. 27, 1944

WITNESSES:
Edward Michaels
Nw. C. Groome

INVENTOR
Charles H. Braithwaite, Jr.
BY O.D. Buchanan
ATTORNEY

Patented Aug. 24, 1948

2,447,631

UNITED STATES PATENT OFFICE 2,447,631

WATERPROOF ELECTRICAL COIL

Charles H. Braithwaite, Jr., Pittsburgh, Pa., assignor to Westinghouse Electric Corporation, East Pittsburgh, Pa., a corporation of Pennsylvania Application September 27, 1944, Serial No. 556,064

10 Claims. (Cl. 175—21)

My invention relates to an improved field-coil of an electric motor, or other multi-turn coil of an electrical apparatus, having improved moisture-proofing means.

It has long been customary to impregnate the insulated conductors comprising the coils of electrical machines. By insulated conductors, I mean to include bare conductors with turn-insulation, in so-called "mummified" coils. It has also been known that it is difficult to obtain a truly impregnated coil, that is, one in which all of the voids and crevices are filled with the impregnant. It has also been known that it is comparatively simple to apply an outer surface-film of the modified alkyd type, or other varnish-film, which completely fills the voids of just a few of the outer layers of the finish-tape around a completed coil. Thus, a complete outer encapsulating covering is provided, which entirely encases the coil. This is perhaps the simplest method of obtaining a moisture-proof coil.

The difficult spots to maintain this encapsulating film are around the leads. Heretofore, it has been customary to place glass wool, or other impregnable insulation, in the crevices around the places where the leads come out of the coil, but trouble has been experienced in completely filling the voids in the wool-varnish insert, so that water-seepage into the coil has been an all-too-frequent difficulty, experienced with coils having water-proofing in the form of an encapsulating varnish-film.

The object of my present invention is to provide a thermoplastic, or other heat-softenable, barrier, by which I mean to include any coating or filling or sheeting, surrounding the portion of the coil and each lead, at the place where the lead comes out of the coil, before applying the finish-layer of impregnated, waterproofed tape and varnish coating. This thermoplastic barrier or sheeting provides a support for the waterproofing varnish-film. The thermoplastic barrier or sheeting softens at a temperature some 10 to 15 degrees below the baking-temperature of the varnish which is used. The temperature of baking will then cause the thermoplastic to soften and flow, thus sealing the thermoplastic to the coil and to the cable or insulated leads, causing the final coating of varnish to completely coat over the surface of the thermoplastic, while, at the same time, the edges of the thermoplastic barrier are firmly held in place, and tightly sealed, by means of the covering of varnish-impregnated tape which overlaps the edges of the thermoplastic barrier. Experience has shown that this type of waterproof seal is so reliable that failures due to water-seepage into the coil always occur at some place other than the thermoplastic seal.

By way of illustration, I am showing my invention, in the accompanying drawing, applied to the field coils of a direct-current electric railway motor. Fig. 1 is a longitudinal sectional view of a motor embodying a waterproof coil of my present invention, Fig. 2 is an end view of one of the coils, with a shaded area indicating one of the places where some special waterproofing treatment is needed, Fig. 3 is a detailed sectional view, on approximately the line III—III of Fig. 2, illustrating my invention.

Fig. 1 shows a direct-current railway motor of a type to which my invention is particularly applicable. The motor has a rotatable armature-member 4, which is mounted within a stationary field-frame 5 having a number of salient pole-pieces 6 surrounded by field-coils 7 which require the waterproofing treatment which I have been discussing.

Figure 2:
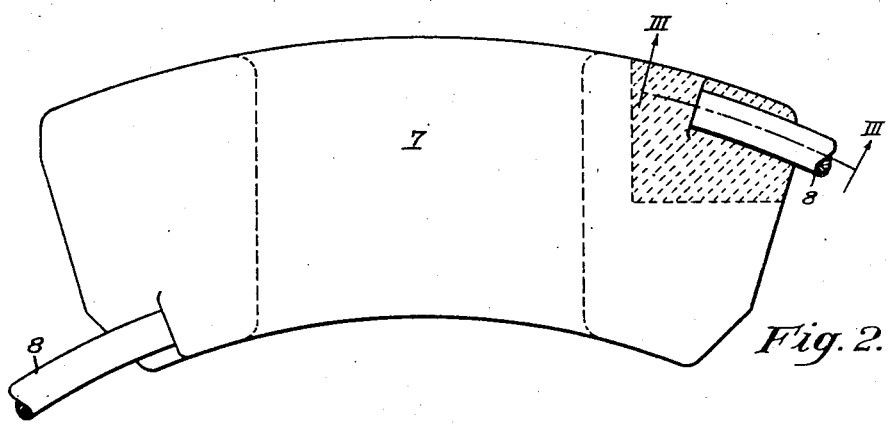
Figure 3:
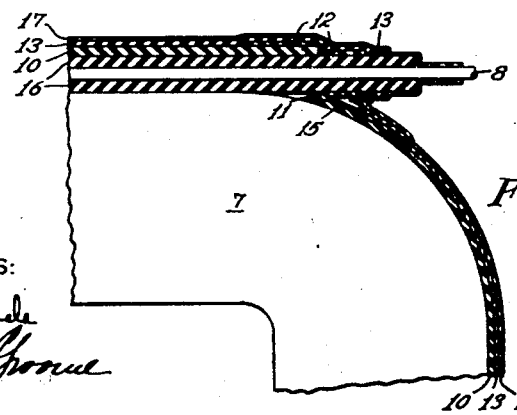

Each of the coils 7 is a prefabricated coil consisting of a number of turns of an insulated electrical conductor, having one or more leads 8 extending out of the coil, as shown in Figs. 2 and 3. When the winding of the coil is completed, it is wrapped around with one or more wrappings or layers of mica tape 10, or other insulating binding, which holds the coil firmly together. The trouble where water-seepage has been a problem, heretofore, is at the point or points where the leads 8 leave the coil, particularly in the sharp-angle crack or angle-crevice 11 where the curving wall of the coil separates itself from the outgoing lead 8. In accordance with my invention, this region 11 of the coil, and the entire region surrounding the place where each lead 8 leaves the coil 7, is covered with one or more sheets of the heat-softenable barrier-material, which is preferably of the thermoplastic type, as shown at 12.

After this heat-softenable barrier 12 has been applied, an impregnated finishing covering is provided, in the form of an impregnated finishing-tape 13, which is impregnated with a suitable varnish of the type which needs to be baked. The impregnating may be done either before applying the finishing-tape 13, or afterwards, as by painting or dipping. The finishing tape 13 is bound around the coil 7, and a portion of it is also bound around the lead or leads 8, close to the place or places where the lead or leads leave the coil. Said finishing tape 13 also overlaps the exposed portion of the thermoplastic seal or barrier 12, so as to bind the same firmly in place. The coil is then subjected to the customary baking-operation, which serves to set or partially harden the impregnating varnish.

Choice of the thermoplastic barrier or sheeting 12 will be governed by the temperature used in this baking of the varnish. At present, it is customary to utilize a baking-temperature of the order of 135 to 145° C. I prefer to choose a thermoplastic sheeting of a material which will soften at a temperature slightly below the baking temperature, preferably some 10 or 15° C. below the baking-temperature. Thus, when the baking-temperature is 135 to 145° C., I may use a "Saran" film, which is a polyvinylidene chloride, or I may use a copolymer of vinyl chloride-vinyl acetate, which softens at 120 to 130° C., with a slight preference for the copolymer. The temperature of baking thus causes the thermoplastic to soften and flow, which will cause the thermoplastic 12 to be pressed, by the tape, into, and to stick to, and to seal, the insulating cover 16 of the cable or lead 8, the inner tape covering 10 of the coil 7, and the finishing tape 13.

After this baking operation, a final coating or varnish-film 17, of an encapsulating varnish, is applied over the whole, over the finishing tape 13, over any portion 15 of the thermoplastic seal or barrier 12 which may be exposed in the crack or crevice 11, and over a portion of the conductor-insulation 16 beyond the finishing tape 13. This encapsulating varnish 17 may, or may not, be hardened in a second baking-operation.

A coil so insulated, is capable of withstanding complete immersion in water for long periods of time, which is much more severe service than will be ordinarily expected of it in practice, and when failure finally does result, it will occur at some point other than the lead-junction which has been treated by my thermoplastic seal.

I claim as my invention:

1. Electrical apparatus comprising a multi-turn coil of an insulated conductor having one or more leads extending out of the coil, a heat-softenable barrier disposed within the place where each lead leaves the coil and adherently coating a portion of the adjacent surfaces of the coil and the lead, and an encapsulating insulating covering over the coil, the lead, and the barrier.

2. Electrical apparatus comprising a multi-turn coil of an insulated conductor having one or more leads extending out of the coil, a barrier of a heat-changeable polymerizing organic compound disposed within the place where each lead leaves the coil and adherently coating a portion of the adjacent surfaces of the coil and the lead, and an encapsulating insulating covering over the coil, the lead, and the barrier.

3. Electrical apparatus comprising a multi-turn coil of an insulated conductor having one or more leads extending out of the coil, a heat-softenable barrier disposed within the place where each lead leaves the coil and adherently coating a portion of the adjacent surfaces of the coil and the lead, a tape covering entirely surrounding the coil and surrounding the portion of each lead which comes out of the coil and surrounding the exposed portion of the barrier, and an encapsulating insulating covering of impregnating material over the tape and any untaped portion of the barrier.

4. Electrical apparatus comprising a multi-turn coil of an insulated conductor having one or more leads extending out of the coil, a barrier of a heat-changeable polymerizing organic compound disposed within the place where each lead leaves the coil and adherently coating a portion of the adjacent surfaces of the coil and the lead, a tape covering entirely surrounding the coil and surrounding the portion of each lead which comes out of the coil and surrounding the exposed portion of the barrier, and an encapsulating insulating covering of impregnating material over the tape and any untaped portion of the barrier.

5. Electrical apparatus comprising a multi-turn coil of an insulated conductor having one or more leads extending out of the coil, a heat-softenable barrier disposed within the place where each lead leaves the coil and adherently coating a portion of the adjacent surfaces of the coil and the lead, and an encapsulating covering of impregnated tape entirely surrounding the coil and surrounding the portion of each lead which comes out of the coil and surrounding the exposed portion of the barrier, said tape being impregnated with a hardenable, adherent insulating material.

6. Electrical apparatus comprising a multi-turn coil of an insulated conductor having one or more leads extending out of the coil, a barrier of a heat-changeable polymerizing organic compound disposed within the place where each lead leaves the coil and adherently coating a portion of the adjacent surfaces of the coil and the lead, and an encapsulating covering of impregnated tape entirely surrounding the coil and surrounding the portion of each lead which comes out of the coil and surrounding the exposed portion of the barrier, said tape being impregnated with a hardenable, adherent insulating material.

7. Electrical apparatus comprising a multi-turn coil of an insulated conductor having one or more leads extending out of the coil, a heat-softenable barrier surrounding the portion of the coil and each lead at the place where the lead comes out of the coil, and an encapsulating covering of impregnated tape entirely surrounding the coil and surrounding the portion of each lead which comes out of the coil, said encapsulating tape being impregnated with a baked insulating material of a composition requiring a predetermined baking-temperature, and said heat-softenable barrier being an insulating compound which softens upon application of heat at a temperature slightly lower than said predetermined baking-temperature.

8. Electrical apparatus comprising a multi-turn coil of an insulated conductor having one or more leads extending out of the coil, a heat-softenable barrier disposed within the place where each lead leaves the coil and coating a portion of the adjacent surfaces of the coil and the lead, and an encapsulating covering of impregnated tape entirely surrounding the coil and surrounding the portion of each lead which comes out of the coil, said encapsulating covering also overlapping a portion of said barrier, said encapsulating tape being impregnated with a baked insulating material of a composition requiring a predetermined baking-temperature, and said heat-softenable barrier being an insulating compound which softens upon application of heat at approximately the same baking-temperature, whereby one baking-operation will suffice to treat both the barrier and the tape.

9. Electrical apparatus comprising a multi-turn coil of an insulated conductor having one or more leads extending out of the coil, a barrier of a heat-changeable polymerizing insulating organic compound surrounding the portion of the coil and each lead at the place where the lead comes out of the coil, and an encapsulating covering of impregnated tape entirely surrounding the coil and surrounding the portion of each lead which comes out of the coil, said encapsulating tape being impregnated with a baked insulating material of a composition requiring a predetermined baking-temperature, and said heat-softenable barrier being an insulating compound which softens upon application of heat at a temperature slightly lower than said predetermined baking-temperature.

10. Electrical apparatus comprising a multiturn coil of an insulated conductor having one or more leads extending out of the coil, a barrier of a heat-changeable polymerizing insulating organic compound disposed within the place where each lead leaves the coil and coating a portion of the adjacent surfaces of the coil and the lead, and an encapsulating covering of impregnated tape entirely surrounding the coil and surrounding the portion of each lead which comes out of the coil, said encapsulating covering also overlapping a portion of the coating provided by said polymerizing compound, said encapsulating tape being impregnated with a baked insulating material of a composition requiring a predetermined baking-temperature, and said polymerizing compound polymerizing at approximately the same baking-temperature, whereby one baking-operation will suffice to treat both the barrier and the tape.

CHARLES H. BRAITHWAITE, Jr.

REFERENCES CITED

The following references are of record in the file of this patent:

UNITED STATES PATENTS

| Number | Name | Date |
|---|---|---|
| 2,183,811 | Homan | Dec. 19, 1939 |
| 2,241,761 | Blaisdell | May 13, 1941 |
| 2,249,959 | Johannessen | July 22, 1941 |
| 2,275,967 | Keillor | Mar. 10, 1942 |

OTHER REFERENCES

Youmans article on "Plastic Insulation for Conductors."
Electrical World for Sept. 4, 1943, pages 68–71.